VLADIMIR KARYCHEFF AND PRINCE EUGENE GAGARINE.
APPARATUS FOR FEEDING FUEL TO FURNACES.
APPLICATION FILED FEB. 16, 1922.
1,422,867.
Patented July 18, 1922.
3 SHEETS—SHEET 2.
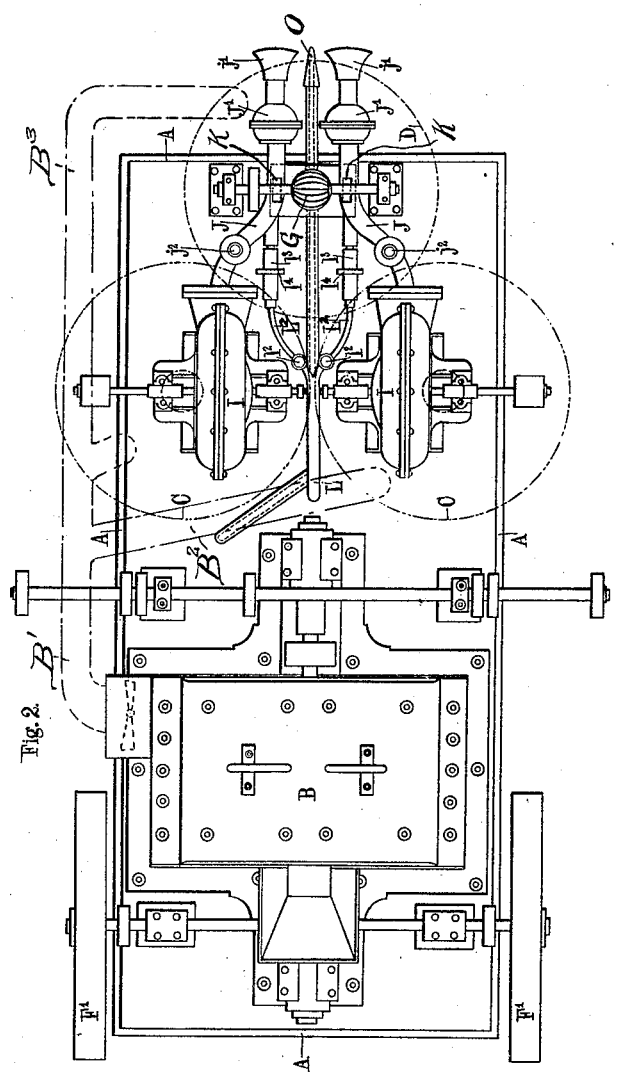
Inventors
V. Karycheff
P. E. Gagarine
By Marks&Clerk
Attys.

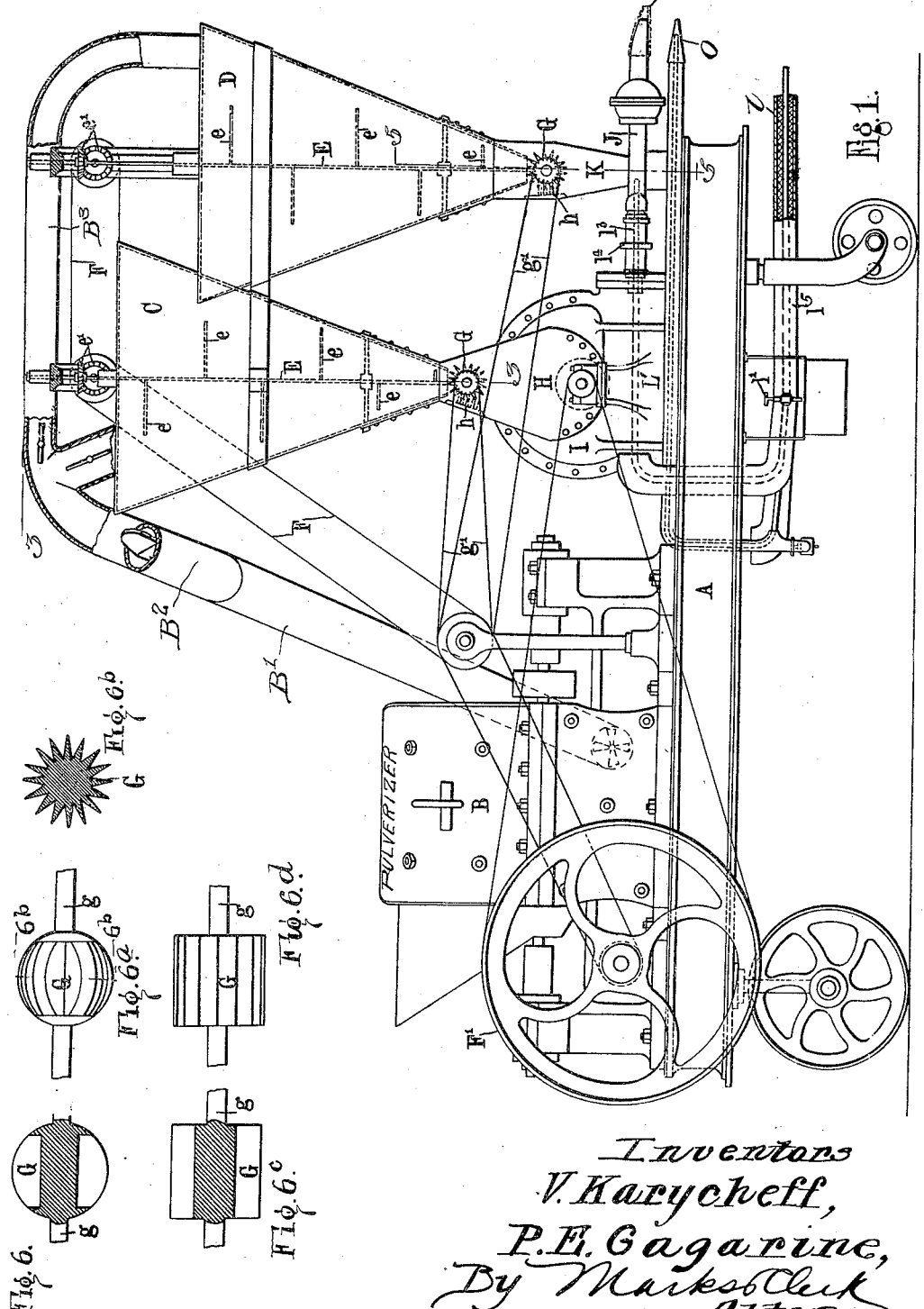

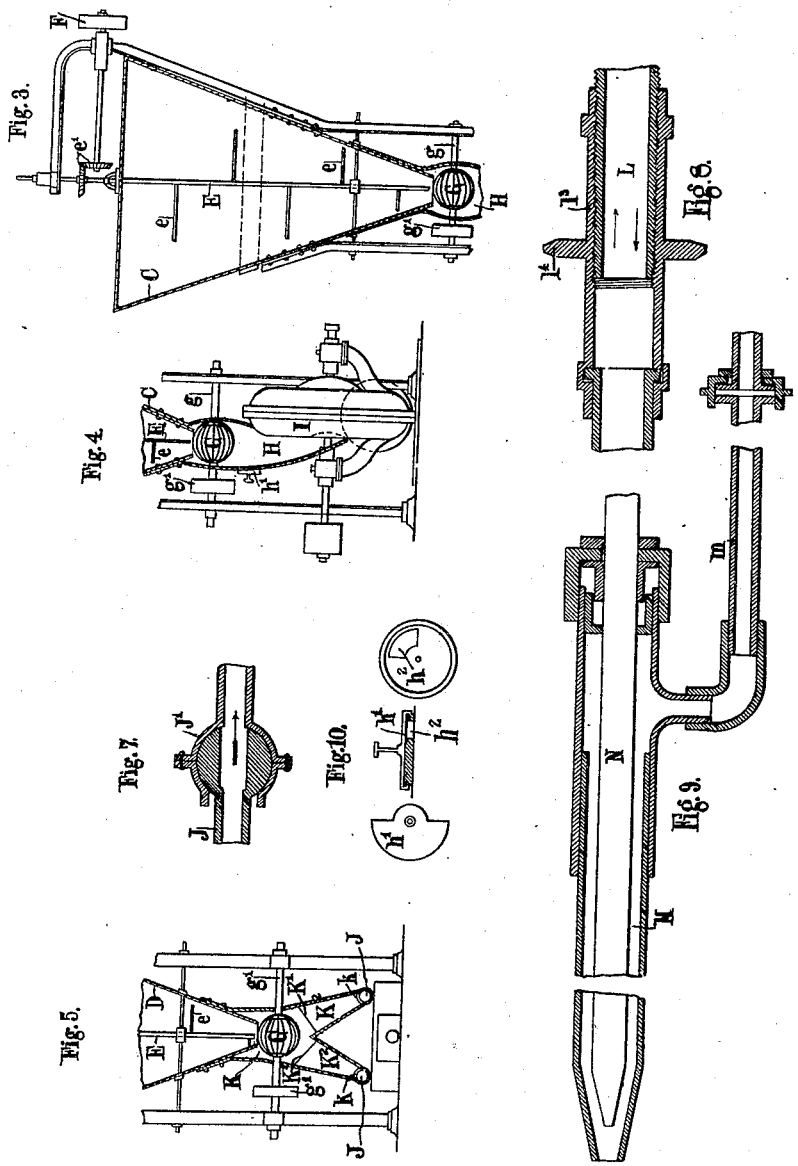

UNITED STATES PATENT OFFICE.

VLADIMIR KARYCHEFF AND PRINCE EUGENE GAGARINE, OF PARIS, FRANCE.

APPARATUS FOR FEEDING FUEL TO FURNACES.

1,422,867.  Specification of Letters Patent.  Patented July 18, 1922.

Application filed February 16, 1922. Serial No. 537,112.

*To all whom it may concern:*

Be it known that we, VLADIMIR KARYCHEFF and PRINCE EUGENE GAGARINE, both citizens of Russia, and both residing at 79 Rue de Grenelle, Paris, France, have invented certain new and useful Improvements in and Relating to Apparatus for Feeding Fuel to Furnaces, of which the following is a specification.

This invention relates to improvements in apparatus for feeding fuel to furnaces or steam generators and has for its object to provide means for continuously injecting into a furnace, a fuel dust or powder of a solid fuel in a regulated quantity, mixed if necessary with a liquid or gaseous fuel and with the air needed for combustion in a chamber which constitutes the furnace.

The invention consists in an apparatus for feeding fuel to furnaces, comprising in combination a mill for reducing the fuel to powder, hoppers with means for assisting in moving the powdered fuel to feeders, feeders furnishing the powdered fuel in regulated quantities to fans, fans for mixing the powdered fuel with air, and passing the mixture to injectors, and injectors or twyers for injecting the fuel into the combustion chamber of the furnace or steam generator.

The invention also consists in an apparatus for feeding fuel to furnaces, comprising in combination the components as set forth in the preceding paragraph, and in which the said feeders each comprising a rotatably mounted element having blades attached thereto for engaging the powdered fuel.

The invention also includes an injector provided with an adjustable nozzle; means to permit the use of steam for promoting the flow of the powdered fuel, and a screen and conveyor for returning the coarser fuel material to the mill for re-grinding.

The combustion of the fuel powder when obtained in accordance with this invention in conjunction with a regenerator may be considered as a method of combustion between the rapid combustion of ordinary dusts and the instantaneous explosion of sprays. The system of combustion and the arrangement of the furnace are conducive to a great saving in fuel as compared with ordinary furnaces. In addition there is the possibility of utilizing turfs and lignites, fuels of very low grade, the use of which so far has been very limited.

In order to obtain the best results, the powder to which the solid fuel substance must be reduced should be so fine that when projected into a calm atmosphere it should remain in suspension without falling even after a long space of time. It will, therefore, be seen that ordinary coal dust, obtained by screening coal with screens which serve to sort out the finest dust cannot be practically employed because the dust even after having passed through the finest screen is still insufficiently divided to affect the principle of the present invention under the most favourable conditions. Nevertheless any solid fuel reduced to the state of a fine powder and graded by means of screens could be used according to this invention, but it should be borne in mind that the most useful effect and the greatest economy resulting from the use of these furnaces can only be obtained when this solid fuel is reduced to the state of a true powder.

The reduction of a solid substance to this state, which may be considered as the limit of the solid state, might be obtained by a chemical process. In practice, however, and in view of the expense of this latter method, as perfect as possible a mechanical grinding by means of mills is accepted as sufficient. Industry already possesses numerous mills capable of reducing solid substances to a very fine powder and even partly to dust. Therefore already known ills may be used as several are available which are capable of reducing the fuel to a sufficiently fine powder suitable for carrying into effect the principle of the present invention. In view of the fact that the storage of large reserves of fuel powder as well as the storage of solid fuels reduced to a fine powder is somewhat dangerous, it is advisable that this reduction to powder be carried out at the time of using the fuel.

In order that the carrying of the invention into effect may be understood, reference will now be made to the accompanying drawings, in which:—

Figure 1 is a side view partly in section of the entire apparatus.

Fig. 2 is a plan view of the lower portion of the apparatus and showing the location of the feed hoppers and conveyor in dot and dash lines.

Fig. 3 is a transverse vertical sectional view of one of the hoppers taken on the line 3—3 of Fig. 1.

Fig. 4 is a detail view partly in section illustrating the means for conveying the powdered fuel from one of the hoppers to one of the fans.

Fig. 5 is a transverse vertical sectional view taken on line 5—5 of Fig. 1.

Fig. 6 is a longitudinal vertical sectional view of one form of feeder employed in feeding the powdered fuel from a fuel hopper into the conveying chute.

Fig. $6^a$ is a side view of said feeder.

Fig. $6^b$ is a transverse vertical sectional view of the feeder taken on line $6^b$—$6^b$ of Fig. $6^a$.

Fig. $6^c$ is a longitudinal sectional view of a modified form of feeder.

Fig. $6^d$ is a side view of the same.

Fig. 7 is a detail sectional view of the means to permit one of the injector nozzles to be universally moved.

Fig. 8 is a detail sectional view of means to permit adjustment of the nozzle toward or away from the furnace.

Fig. 9 is a longitudinal sectional view of a modified form of nozzle for use in burning a mixture of liquid fuel and steam.

Fig. 10 is a plan view of an air regulating damper plate; a sectional view of said plate and the member with which it cooperates assembled, and a plan view of the apertured member with which the damper plate cooperates.

In carrying the invention into effect in one form, the whole of the apparatus is mounted upon a carriage A. Mounted on the frame of this carriage is a mill B for reducing the fuel to the required state of powder. Attached to the mill is an apparatus (not shown) for screening the substance in order to retain the less fine particles which are, by means of a conveyor (not shown in the drawings), sent back to the mill to be re-ground. The fine powder which has been reduced to the state of fuel powder, is sent likewise by conveyors $B^1$ and $B^2$ to two distributing hoppers C, C, of the type hereinafter described. Finally, the fuel powder produced by the grinding is mixed with air supplied by fans, and is by means of injectors sent immediately into the furnace to be burnt.

Each hopper C, hereinbefore referred to, is provided with a vertical shaft E mounted in suitable bearings and to which is attached a series of horizontally arranged small rods $e$. This shaft is set in motion by two bevel pinions $e'$ one of which is integral with or attached to the shaft and meshes with the other which receives its motion from some suitable form of transmission. As the shaft E rotates, the rods $e$ agitate the fuel dust to cause the same to move towards the bottom of the hopper, where it meets with a feeder GG' (Figs. 6, $6^a$, $6^b$, $6^c$ and $6^d$). This element is in the form of a small wheel mounted upon a spindle $g$, and provided with blades, which may be curve edges as shown in Figs. 6 and $6^a$ or straight edged, as shown in Figs. $6^c$ and $6^d$. The feeder is rotated by suitable means, and its blades grip the fuel powder at the bottom of the hopper, and project it into a chute or casing H situated between the hopper C and the fan I. The particles of powder remaining upon the blades are removed by a metallic brush $h$ attached to the side of the chute H. After having passed from the chute H into the fan I, the fuel powder is carried by the air pressure produced by the fan into an injector J. The admission of air through the aperture $h^2$ into the chute H is regulated by the cover $h'$ which is rotatably mounted in a suitable manner, and is illustrated in one form in Figure 10 of the accompanying drawings. Means are provided which permit placing the nozzle of the injector in any desired position, and of varying the orifice at will by the attachment of end pieces; the size of the orifice being dependent upon the class of fuel powder to be used. Thus, by varying the speed of rotation of the shafts E within the two hoppers C and the fans I, and by the use of suitable injector nozzles $j'$, the admission of the fuel powder into the furnace may be regulated at will.

In addition to the injection of the fuel powder into the furnace by the air from the fan, the apparatus is further adapted to permit of the injection of the fuel dust by steam which may be exhaust steam heated in an economizer. In order to inject the fuel by means of steam, the apparatus is provided with a third hopper D, which is similar in construction to the hoppers hereinbefore described. The powdered fuel is fed to the hopper D by a conveyor $B^3$. A chute or casing K is arranged at the lower end of the hopper D and the fuel from the hopper is fed into the chute or casing K by means of a feeder G situated at the base of the hopper, as shown in Figure 5. The fuel is fed from the casing or chute to one or both of the injectors by the means hereinafter described. To permit this, the chute K is provided with two extensions $K^2$ having valves $K'$. When the valves $j^2$ (Fig. 2) are closed, the air from the fans I is cut off from the injectors, and at this time the shaft E and feeder G of the hopper D may be set in motion, and the fuel dust from the hopper D will be fed into the extensions $K^2$ of the chute.

The steam pipes L² enter the rear ends of the injectors J and project forward as far as the admission openings k. These openings are arranged in the injectors J and they permit the fuel to pass from the extensions K² into the injectors. Regulating valves l² for the steam (Fig. 2) are provided. Drain cocks l' (Fig. 1) are provided in order to permit the discharge of condensation water. The steam pipe L is lagged by non-heat-conducting material l arranged in a casing l⁵. The positions of the ends of the pipes L² in relation to the admission openings B are controlled by threaded sleeves l³ actuated by wheels l⁴. The steam emerging from the pipes L² engages with the powder passing within the apertures k, and then injects it into the furnace. The appliances just described serve to regulate the admission of steam and fuel in the best proportions.

The apparatus is further provided with additional arrangements which allow of heating the furnace with liquid naphtha or liquid resins. For this purpose the apparatus is provided with a sprayer injector O (shown in Figures 1 and 2) for injecting the previously heated fuel into the furnace. The liquid fuel, naphtha for instance, as shown in the modification in Fig. 9, enters the tube m connecting with the larger tubes M of the injector surrounding a smaller tube N through which the fuel passes and meets the steam issuing from the said tube m near the orifice of the injector which is at the end of the aforesaid large tube M. The steam and naphtha are regulated by means of suitable delivery taps (not shown).

The various apparatuses situated upon the carriage A are driven from a central shaft by means of belts F, although alternatively each element may be supplied with an independent source of motive power, consisting, for instance, of a small electric motor.

The apparatus as above described thus allows of feeding a furnace fire-box, boiler furnace, etc., with liquid fuel and solid fuel, or either of them. If heating is only to be effected by a single kind of fuel, for instance, turf, lignite, or coal in a state of powder, the apparatus is much simpler, as it only comprises one hopper such as D, from which the fuel powder is injected by a single fan, or again, what is still simpler, by steam. In this case it is not necessary for the mill to be mounted on the frame carriage; it may be fixed at another place in the vicinity of the apparatus on condition that the fuel dust is immediately conveyed automatically from the mill to the furnace to be instantly burnt there.

Having now described our invention what we claim as new and desire to secure by Letters Patent is:—

1. In a fuel feeding apparatus, an injector pipe having a nozzle at one end and provided intermediate its ends with a fuel inlet aperture, a combined blower and suction fan having its outlet connected to one end of said pipe, a chute for feeding solid fuel communicating with the inlet of said fan, an axially adjustable steam feeding pipe extending into the injector pipe and having its outlet arranged adjacent to said aperture, and means for feeding powdered fuel through the fuel inlet aperture and into the injector pipe.

2. In a fuel feeding apparatus, an injector pipe having a nozzle at one end, a combined blower and suction fan having its outlet communicating with the interior of said pipe, a chute for feeding solid fuel communicating with the inlet of said fan, a hopper connected to said chute, a feeder arranged between said hopper and chute for feeding fuel from the hopper to the chute in regulated quantities, and a pipe for furnishing steam to the interior of said injector pipe, said steam pipe extending into the injector pipe, and an auxiliary chute connected to said injector pipe, said injector pipe having an opening to permit fuel from the auxiliary chute to be passed into the injector pipe.

3. In combination, a plurality of main fuel hoppers, a plurality of combined suction and pressure fans, chutes for feeding fuel from the hoppers to the inlets of said fans, means for permitting air to enter said chutes in order to entrain fuel, feeders arranged between said hoppers and chutes for feeding fuel in regulated quantities from the hoppers to the chutes, an auxiliary fuel feeding hopper having a bifurcated discharge chute, a plurality of injector pipes provided at their forward ends with nozzles and having apertures to permit fuel from the auxiliary hopper chute to be fed into said injector pipes, conveying pipes connecting the outlets of said fans to the injector pipes, valves arranged in the pipes between the fans and injector pipes, a steam supply pipe, and valve controlled branches extending from the steam supply pipe to the rear ends of said injector pipes.

4. The combination with a wheel supported truck, of a fuel pulverizing mill mounted on said truck, an injector pipe carried by said truck and provided at its forward end with a nozzle, a combined suction and pressure fan mounted on said truck and having means connecting its outlet to said injector pipe, a chute carried by said truck and connected to the inlet of said fan, a hopper connected to said chute, means permitting air to enter said chute, and a conveyor supported by the truck and arranged to convey powdered fuel from the pulverizing mill to said hopper.

5. A combination as claimed in claim 4 in which the injector pipe is provided with an aperture, an auxiliary hopper and chute for supplying fuel to be passed through said aperture and into the injector pipe, an auxiliary conveyor for furnishing fuel to the auxiliary hopper, a valve arranged in the means connecting the fan outlet to the injector pipe, and a valved steam supply pipe extending into said injector pipe and having its forward end arranged adjacent to said aperture.

In testimony whereof we have signed our names to this specification.

VLADIMIR KARYCHEFF.
PRINCE EUGENE GAGARINE.